United States Patent
Molnar

(10) Patent No.: US 8,369,793 B2
(45) Date of Patent: Feb. 5, 2013

(54) CHANNEL-DEPENDENT SCHEDULING AND LINK ADAPTATION

(75) Inventor: Karl Molnar, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 594 days.

(21) Appl. No.: 12/572,415

(22) Filed: Oct. 2, 2009

(65) Prior Publication Data

US 2011/0081871 A1    Apr. 7, 2011

(51) Int. Cl.
*H04B 17/00* (2006.01)

(52) U.S. Cl. .................. 455/67.13; 455/67.14; 455/63.1; 455/452.2; 455/522; 455/69; 455/277.2; 370/335; 370/329; 370/342; 370/347; 375/131; 375/141

(58) Field of Classification Search ............... 455/67.13, 455/67.14, 63.1, 437, 452.2, 522, 69, 277.2; 370/335, 342, 337, 330, 329, 346, 347; 375/131, 375/224, 141
See application file for complete search history.

(56) References Cited

U.S. PATENT DOCUMENTS

| | | | | |
|---|---|---|---|---|
| 6,081,566 | A * | 6/2000 | Molnar et al. ............... | 375/347 |
| 6,807,426 | B2 * | 10/2004 | Pankaj ........................ | 455/453 |
| 7,203,461 | B2 * | 4/2007 | Chang et al. ............... | 455/67.13 |
| 7,403,745 | B2 * | 7/2008 | Dominique et al. ....... | 455/67.11 |
| 7,406,337 | B2 * | 7/2008 | Kim et al. .................. | 455/562.1 |
| 7,457,588 | B2 * | 11/2008 | Love et al. ................. | 455/67.11 |
| 7,636,573 | B2 * | 12/2009 | Walton et al. .............. | 455/454 |
| 7,664,465 | B2 * | 2/2010 | Shen et al. .................. | 455/63.1 |
| 7,668,227 | B2 * | 2/2010 | Grant et al. ................ | 375/148 |
| 7,899,405 | B2 * | 3/2011 | Han et al. ................... | 455/69 |
| 7,912,433 | B2 * | 3/2011 | Molnar et al. ............. | 455/226.1 |
| 7,933,560 | B2 * | 4/2011 | Han et al. ................... | 455/69 |
| 7,953,139 | B2 * | 5/2011 | Mesecher et al. ......... | 375/147 |
| 7,979,075 | B2 * | 7/2011 | Cheng et al. .............. | 455/450 |
| 8,099,132 | B2 * | 1/2012 | Kim et al. .................. | 455/562.1 |
| 8,185,057 | B2 * | 5/2012 | Molnar et al. ............. | 455/67.11 |
| 2003/0123396 | A1 * | 7/2003 | Seo et al. ................... | 370/252 |
| 2005/0201447 | A1 | 9/2005 | Cairns et al. | |

(Continued)

FOREIGN PATENT DOCUMENTS

WO    WO 93/11618 A1    6/1993
WO    WO 01/91322        11/2001

(Continued)

OTHER PUBLICATIONS

Kwon et al.: "Performance evaluation between CDMA systems by mobile system interference simulator", Proceedings of the IEEE Region 10 Conference, vol. 2, Sep. 15, 1999, Sep. 17, 1999.

*Primary Examiner* — Marceau Milord

(57) ABSTRACT

A mobile terminal measures interference over multiple measurement periods and generates interference probability data based on the statistical distribution of the interference measured. The interference probability data may describe, for example, the probability of each possible level of interference expected at the mobile terminal. The mobile terminal derives channel quality information as feedback to a base station based on this interference probability data (e.g., when noise at the mobile terminal falls below a threshold). In one embodiment, the mobile terminal does so by estimating from the interference probability data the probability of successfully receiving a transmission if certain feedback information is reported. Derived in this way, the feedback information more reliably indicates interference likely present at the mobile terminal when the base station sends the transmission. Accordingly, the base station controls the transmission based on the feedback information, and in some embodiments, also based on the interference probability data.

30 Claims, 5 Drawing Sheets

U.S. PATENT DOCUMENTS

| | | |
|---|---|---|
| 2007/0254602 A1 | 11/2007 | Li et al. |
| 2007/0259671 A1 | 11/2007 | Cheng et al. |
| 2008/0212539 A1 | 9/2008 | Bottomley et al. |
| 2009/0097583 A1 * | 4/2009 | Shin et al. .................... 375/267 |

FOREIGN PATENT DOCUMENTS

| | | |
|---|---|---|
| WO | WO 2004/042982 | 5/2004 |
| WO | WO 2007/107944 | 9/2007 |

* cited by examiner

| q | 1 | 2 | 3 | 4 | 5 | 6 | 7 |
|---|---|---|---|---|---|---|---|
| SINR range (dB) (for SNR = 25 dB) | SINR=0 | 0<SINR≤5 | 5<SINR≤10 | 10<SINR≤15 | 15<SINR≤20 | 20<SINR≤25 | SINR > 25 |
| # of observations (out of 100 observations) | 10 | 10 | 20 | 30 | 20 | 10 | |
| Prob (SINR range = q) | 0.1 | 0.1 | 0.2 | 0.3 | 0.2 | 0.1 | 0 |
| Prob (SINR range ≥ q) | 1 | 0.9 | 0.8 | 0.6 | 0.3 | 0.1 | 0 |

*FIG. 2*

| SINR Range (dB) | Transport Format | Prob of successfully receiving 1 transmission | Payload (kb) | Prob of successfully receiving 24 kb over 4 transmissions |
|---|---|---|---|---|
| SINR = 0 | TF 1 | 1 | 2 | n/a |
| 0 < SINR ≤ 5 | TF 2 | 0.9 | 6 | 0.6561 |
| 5 < SINR ≤ 10 | TF 3 | 0.8 | 8 | 0.8192 |
| 10 < SINR ≤ 15 | TF 4 | 0.6 | 12 | 0.8208 |
| 15 < SINR ≤ 20 | TF 5 | 0.3 | 24 | 0.7599 |
| 20 < SINR ≤ 25 | TF 6 | 0.1 | 48 | n/a |
| SINR > 25 | TF 7 | 0 | 96 | n/a |

*FIG. 3*

| q, p | 1 | 2 | 3 | 4 | 5 | 6 | 7 |
|---|---|---|---|---|---|---|---|
| SINR range (dB) (for SNR = 25 dB) | SINR=0 | 0<SINR≤5 | 5<SINR≤10 | 10<SINR≤15 | 15<SINR≤20 | 20<SINR≤25 | SINR > 25 |
| Prob (SINR range at RX1 = q) | 0.1 | 0.1 | 0.2 | 0.3 | 0.2 | 0.1 | 0 |
| (Prob SINR range at RX2=p given that SINR range at RX1=1) | 0.3 | 0.5 | 0.2 | 0 | 0 | 0 | 0 |
| (Prob SINR range at RX2=p given that SINR range at RX1=2) | 0 | 0.3 | 0.5 | 0.2 | 0 | 0 | 0 |
| (Prob SINR range at RX2=p given that SINR range at RX1=3) | 0 | 0 | 0.3 | 0.5 | 0.2 | 0 | 0 |
| (Prob SINR range at RX2=p given that SINR range at RX1=4) | 0 | 0 | 0 | 0.3 | 0.5 | 0.2 | 0 |
| (Prob SINR range at RX2=p given that SINR range at RX1=5) | 0 | 0 | 0 | 0 | 0.5 | 0.5 | 0 |
| (Prob SINR range at RX2=p given that SINR range at RX1=6) | 0 | 0 | 0 | 0 | 0 | 1 | 0 |
| Prob (SINR range at RX2 = p) | 0.03 | 0.08 | 0.13 | 0.21 | 0.29 | 0.26 | 0 |
| Prob (SINR range at RX2 ≥ p) | 1 | 0.97 | 0.89 | 0.76 | 0.55 | 0.26 | 0 |

FIG. 4

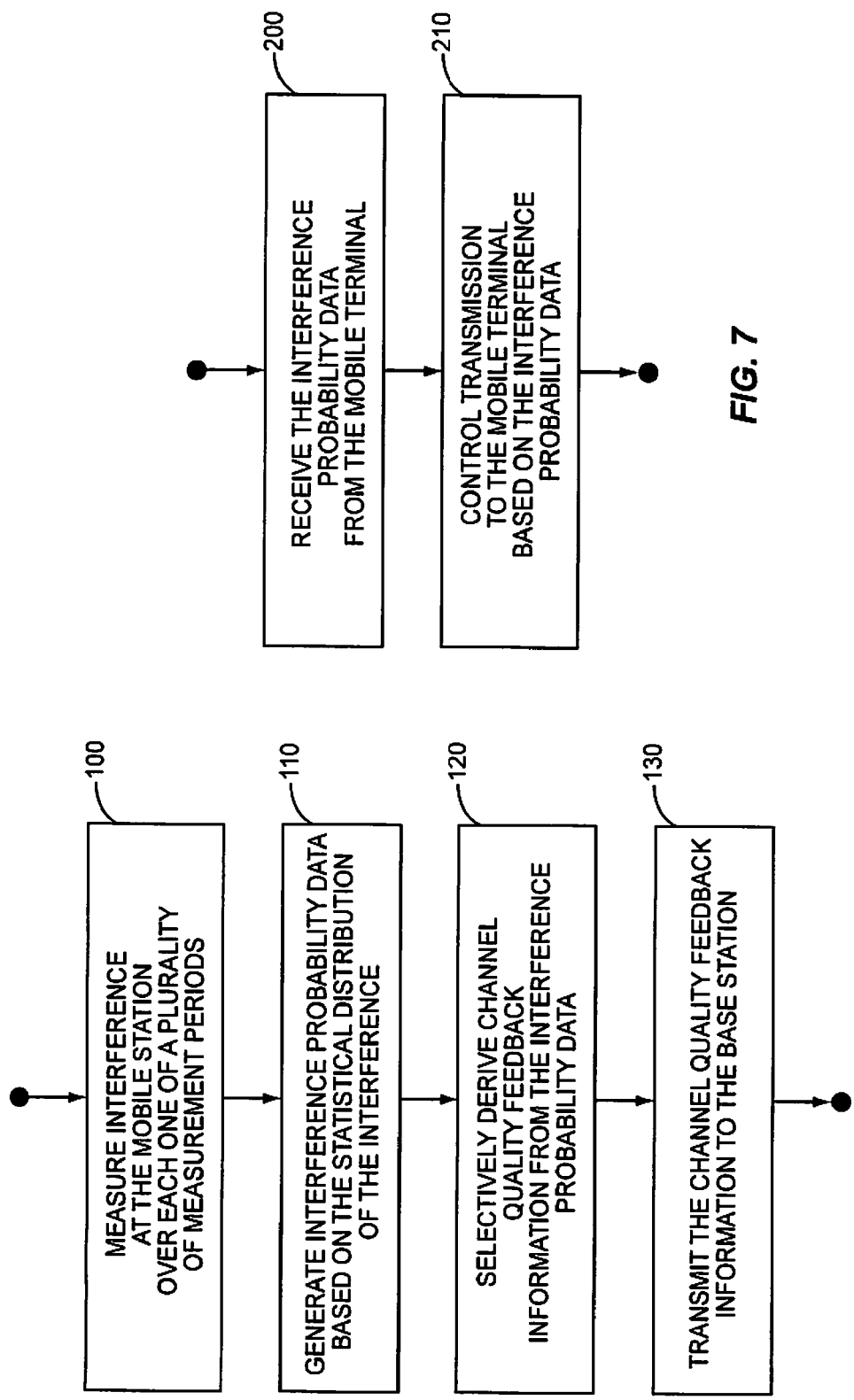

CHANNEL-DEPENDENT SCHEDULING AND LINK ADAPTATION

TECHNICAL FIELD

The present invention relates generally to channel-dependent scheduling and link adaptation in wireless communication systems, and particularly to channel-dependent scheduling and link adaptation in the presence of discontinuous interference.

BACKGROUND

In a common approach to channel-dependent scheduling and link adaptation, a base station schedules downlink transmissions to mobile terminals based on which mobile terminal experiences favorable channel conditions. The base station also adjusts one or more downlink transmission parameters (e.g., modulation scheme and channel-coding rate) responsive to those channel conditions. When used in conjunction with one another, as done for High Speed Data Packet Access (HSDPA) services in Wideband CDMA, these technologies greatly enhance downlink performance in terms of higher data rates.

A mobile terminal supports channel-dependent scheduling and link adaptation at the base station by sending channel quality information as feedback to the base station. Channel quality feedback information may indirectly indicate the channel quality as the data rates (i.e., transport block sizes), modulation schemes, and coding rates that can be received by the mobile terminal at a pre-determined reliability or other performance metric. Typically, the mobile terminal derives channel quality feedback information by measuring the noise and interference currently present at the mobile terminal (e.g., as a Signal-to-Interference-Plus-Noise ratio, SINR), and selecting a value for the channel quality feedback information indicative of that measurement. The base station then performs channel-dependent scheduling and link adaptation on the assumption that the noise and interference present at the mobile terminal has not substantially changed since the mobile terminal measured it.

In circuit switched systems, this assumption is often justified because interference at the mobile terminal is approximately continuous (i.e., transmissions to other mobile terminals, such as those in neighboring cells, are continuous). Because interference is continuous, the base station can effectively base link adaptation on the assumption that interference has not significantly changed between the time when the mobile terminal measured it and the time when the corresponding channel quality feedback information is actually used by the base station. Moreover, the mobile terminal can reduce potential error in interference measurements due to random noise by averaging them over a period of time.

In packet-switched systems, however, interference at the mobile terminal may be discontinuous due to the bursty nature of packet data transmissions to other mobile terminals. This can degrade channel quality feedback information provided by the mobile terminal if the time required to average out random noise in the interference measurements is greater than the time the interference is stationary. Of course, even if this is not the case, the channel quality feedback information used by the base station for scheduling and link adaptation may no longer be reliable simply because interference at the mobile terminal has changed since the time the mobile terminal measured it.

Regardless of the specific reason for its unreliability, if the channel quality feedback information used for scheduling and link adaptation indicates there is less interference than actually present at the mobile terminal at the time of transmission, errors in the transmission will likely occur. Conversely, if the channel quality feedback information indicates there is more interference than actually present, the transmission will be at a lower data rate than that actually possible.

SUMMARY

Methods and apparatus taught herein advantageously provide reliable channel quality feedback information to a base station even when interference present at a mobile terminal served by that base station is discontinuous. Instead of deriving channel quality feedback information based on a single measurement describing interference currently present at the mobile terminal, the methods and apparatus derive channel quality feedback information based on data describing the probability of interference present at the mobile terminal.

Specifically, the mobile terminal measures interference at the mobile terminal over each of a plurality of measurement periods, and generates interference probability data based on the statistical distribution of that interference. In one embodiment, for example, the mobile terminal constructs a frequency distribution of the interference measured and, based on that frequency distribution, generates a probability density function describing the probability that interference at the mobile terminal will fall within different interference ranges.

The mobile terminal selectively derives channel quality feedback information based on this interference probability data. When deriving the feedback information based on the interference probability data, the mobile terminal may estimate the probability of successfully receiving a transmission if a certain value for the channel quality feedback information is reported to the base station. This probability can be determined from the interference probability data as the probability that the interference at the mobile terminal at the time of that transmission will be at or below an interference level associated with the feedback information value reported. The mobile terminal may then select the value having the probability of successful reception closest to a target probability.

Derived in this way, the channel quality feedback information more reliably indicates the interference likely present at the mobile terminal at the time the base station sends the transmission. Accordingly, the transmission is more likely to be received without error and at a rate closer to that actually possible.

In some instances, however, deriving the channel quality feedback information from the interference probability data may not yield a more reliable indication of interference at the mobile terminal (e.g., if a high level of noise present at the mobile terminal masks variations in the interference present). In one embodiment, therefore, the mobile terminal measures noise at the mobile terminal and derives channel quality feedback information based on the interference probability data if the noise level indicated by the measurements falls below a pre-defined noise threshold.

Regardless, the mobile terminal transmits the channel quality feedback information to the base station, which controls the transmissions based on that feedback information. In one embodiment, the mobile terminal also transmits the interference probability data to the base station. In this case, the base station controls transmissions to the mobile terminal based on the interference probability data in the same way as that described above with respect to the mobile terminal's derivation of the feedback information.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a table illustrating an example of various methods for generating interference probability data from a statistical distribution of interference measurements.

FIG. 3 is a table illustrating an example of various methods for controlling transmission to a mobile terminal based on interference probability data.

FIG. 4 is a table illustrating an example of various methods for generating interference probability data also based on a probability distribution of interference improvement.

FIG. 6 is a logic flow diagram illustrating one embodiment of a method for providing channel quality feedback information to a base station.

FIG. 7 is a logic flow diagram illustrating one embodiment of a method for controlling transmission to a mobile terminal.

DETAILED DESCRIPTION

Figure 1:
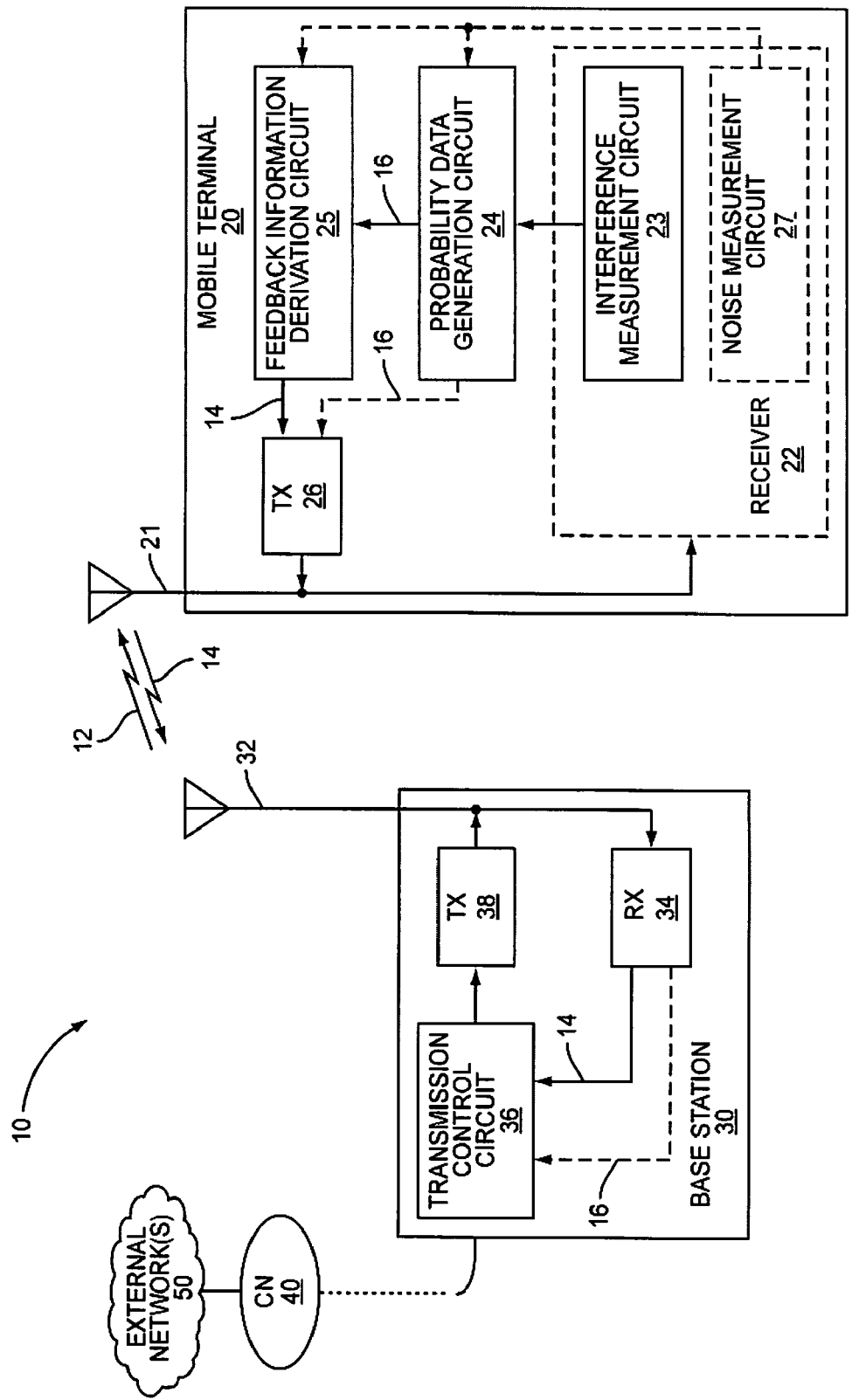
FIG. 1 is a block diagram illustrating one embodiment of a mobile station configured to provide channel quality feedback information to a base station, and one embodiment of a base station configured to control transmission to the mobile station based on that feedback.

FIG. 1 partially illustrates a wireless communication system 10, which includes a plurality of mobile terminals (such as mobile terminal 20), a base station 30, and a Core Network (CN) 40. Each of the mobile terminals wirelessly communicates with the base station 30 over an air interface. The base station 30 in turn communicates via the CN 40 with one or more external networks 50, such as the Internet.

The base station 30 sends transmissions 12 to mobile terminals over a shared traffic channel (e.g., a channel shared by the mobile terminals in the time and/or frequency domain). The base station 30 performs channel-dependent scheduling and link adaptation to schedule transmissions 12 on the shared traffic channel and to adapt one or more parameters of the transmissions 12 responsive to channel conditions experienced by the mobile terminals.

To support channel-dependent scheduling and link adaptation at the base station 30, each mobile terminal 20 sends channel quality feedback information 14 to the base station 30. In one embodiment, the channel quality feedback information 14 indirectly indicates the channel quality as the data rates (i.e., transport block sizes), modulation schemes, and coding rates that can be received by the mobile terminal 20 at a pre-determined reliability or other performance metric. Such amounts to selecting or recommending one of a plurality of downlink transport formats that can be supported at the pre-determined reliability metric (e.g., block error rate, BLER). Regardless of its particular type, however, the reliability of the channel quality feedback information 14 depends on how closely the information 14 indicates the interference present at the mobile terminal 20 at the time the base station 30 sends a transmission 12 to that mobile terminal 20.

Interference present at the mobile terminal 20, however, may be discontinuous, as is often the case if the wireless communication system 10 is packet-switched. When interference is discontinuous, it fluctuates so rapidly and significantly that interference present at the time the mobile terminal 20 measures it likely changes substantially by the time the base station 30 uses channel quality feedback information 14 derived from that measurement for scheduling and link adaptation of a transmission 12 to the mobile terminal 20. Accordingly, to provide reliable channel quality feedback information 14 to the base station 30 even in the presence of discontinuous interference, the mobile terminal 20 derives channel quality feedback information 14 based on data describing the probability of interference present at the mobile terminal 20.

Specifically, the mobile terminal 20 includes one or more antennas 21, a receiver 22, an interference measurement circuit 23, a probability data generation circuit 24, a feedback information generation circuit 25, and a transmitter 26. By way of the antenna 21, the receiver 22 receives transmissions 12 sent from the base station 30 on the shared traffic channel. The interference measurement circuit 23 measures interference at the mobile terminal 20 that might affect those transmissions 12 (e.g., inter-cell interference caused by transmissions sent from other base stations to other mobile terminals). In one embodiment, for example, the interference measurement circuit 23 measures the Signal-to-Interference-Plus-Noise ratio, SINR, of the shared traffic channel at the output of the receiver 22. In other embodiments, the interference measurement circuit 23 measures interference at the mobile terminal 20 that might affect those transmissions 12 using interference measurements on a control or pilot channel. Regardless, the interference measurement circuit 23 measures interference at the mobile terminal 20 over each one of a plurality of measurement periods.

The probability data generation circuit 24 generates interference probability data 16 based on the statistical distribution of the interference measured. As used herein, the term interference probability data 16 refers to any data describing the probability of each possible level (or range of levels) of interference expected at the mobile terminal 20. The term also encompasses data that describes the probability of possible changes in the level (or range of levels) of interference expected at the mobile terminal 20. The term may encompass either discrete or continuous probability distributions depending on e.g., whether the interference measured is quantized or not, and may comprise either a probability density function, a cumulative distribution function, or other type of probability distribution. More particularly, the interference probability data 16 may represent an approximation of some type of ideal probability distribution (i.e., a hypothetical probability distribution) formed using finite, past observations of the interference at the mobile terminal 20.

In one embodiment, for example, the probability data generation circuit 24 (or the interference measurement circuit 23) constructs a frequency distribution of the interference measured, identifying the number of interference observations that fall within each one of a plurality of possible interference ranges. From this frequency distribution, the probability data generation circuit 24 generates interference probability data 16 as an estimate of a probability density function describing the probability that interference at the mobile terminal 20 will fall within each of the possible interference ranges.

In another embodiment, the probability data generation circuit 24 (or the interference measurement circuit 23) determines the mean of the interference measured, as well as the variance or standard deviation of the interference. From these statistics, the probability data generation circuit 24 generates interference probability data 16 as an estimate of a cumulative distribution function describing the probability that interference at the mobile terminal 20 will fall within or below a certain interference range.

Irrespective of the specific representation of the interference probability data 16, or the statistical distribution from which it is generated, the feedback information derivation circuit 25 derives channel quality feedback information 14 from such interference probability data 16. When deriving channel quality feedback information 14 from the interference probability data 16, instead of a single measurement of the interference currently present, the derivation circuit 25 derives the feedback information 14 with data that more reliably estimates the interference present at the mobile terminal 20 when the base station 30 sends a transmission 12 to the mobile terminal 20.

In one embodiment, for example, the derivation circuit 25 estimates, for each possible value of the channel quality feedback information 14, an expected probability that the mobile terminal 20 will successfully receive a transmission 12 if that value is reported back to the base station 30. The expected probability of successful reception for each value of the channel quality feedback information 14 is estimated based on the interference probability data 16, e.g., as the probability that the interference at the mobile terminal 20 at the time of transmission 12 will be at or below an interference level associated with that value of the channel quality feedback information 14. The derivation circuit 25 then selects as the channel quality feedback information 14 the value having an expected probability of successful reception closest to a pre-defined target probability.

In another embodiment, the derivation circuit 25 estimates, for each possible combination of values of the channel quality feedback information 14 over a pre-determined number of transmissions 12, an expected probability that the mobile terminal 20 will successfully receive a pre-determined payload over those transmission 12 if that combination of values is reported back to the base station 30. The expected probability of successful reception for each combination of values of the channel quality feedback information 14 is estimated based on e.g., a binomial distribution. The derivation circuit 25 then selects as the channel quality feedback information 14 the combination of values having the greatest expected probability of successful reception. Both of these embodiments are described below in more detail with reference to an example.

Of course, regardless of the specific manner in which the derivation circuit 25 derives the channel quality feedback information 14 from the interference probability data 16, the transmitter 26 reports this channel qualify feedback information 14 to the base station 30 via the antenna 21.

A receiver 34 included in the base station 30 receives the channel quality feedback information 14 from the mobile terminal 20 via one or more antennas 32. Based on this channel quality feedback information 14, a transmission control circuit 36 also included in the base station 30 performs channel-dependent scheduling and/or link adaptation. That is, the transmission control circuit 36 schedules, adapts parameters of, or otherwise controls transmissions 12 to the mobile terminal 20 based on the received channel quality feedback information 14. This may entail, for example, selecting one of a plurality of downlink transport formats for actually sending the transmission 12 to the mobile terminal 20, selecting a transmission rank of the transmissions 12, selecting between open-loop and closed-loop multiple-input-multiple-output transmission modes, etc. In any event, a transmitter 38 sends these transmissions 12 to the mobile terminal 20. Because the channel quality feedback information 14 was derived by the mobile terminal 20 from the interference probability data 16, it more reliably indicates interference at the mobile terminal 20 at the time the transmitter 38 sends the transmissions 12. Accordingly, the transmissions 12 are more likely to be received without error and at a rate closer to that actually possible, even in the presence of discontinuous interference at the mobile terminal 20.

In some instances, however, deriving the channel quality feedback information 14 from the interference probability data 16 may not yield a more reliable indication of interference at the mobile terminal 20. For example, changes in interference may be masked by a high level of noise at the mobile terminal 20, meaning that channel quality feedback information 14 derived from even a single measurement of interference currently present may still be sufficiently reliable when the mobile terminal 20 receives the corresponding transmission 12.

In one embodiment, therefore, the mobile terminal 20 further includes a noise measurement circuit 27 that measures noise at the mobile terminal over the plurality of measurement periods. The noise measurement circuit 27 may measure, for example, the SNR at the output of the receiver 22. Regardless, these noise measurements indicate a certain level of noise present at the mobile terminal 20, which likely does not vary as rapidly or as significantly as the interference present. If the noise measurements indicate a level of noise below a pre-defined noise threshold, the feedback information derivation circuit 25 derives the channel quality feedback information 14 from the interference probability data 16. Conversely, if the noise measurements indicate a level of noise above the pre-defined noise threshold, the feedback information derivation circuit 25 derives the channel quality feedback information 14 in a conventional manner without regard to the interference probability data 16, e.g., based on a mapping of an instantaneous or time-averaged channel quality measurement (e.g., SNR or SINR) to a plurality of channel quality feedback information values.

It is helpful to consider the selective derivation of channel quality feedback information 14 as described above with respect to an example sequence of noise and interference measurements performed by the mobile terminal 20, as shown in FIGS. 2 and 3. In this example, the noise measurement circuit 27 measures the SNR of the shared traffic channel at the output of the receiver 22 as being approximately 25 dB for each of 100 measurement periods. Assuming for illustrative purposes that such SNR measurements indicate a level of noise below a pre-defined noise threshold, the mobile terminal 20 derives the channel quality feedback information 14 from interference probability data 16 as follows.

Specifically, the interference measurement circuit 23 measures the SINR over those same 100 measurement periods. The frequency distribution 60 in FIG. 2 shows the number of these SINR measurements that fall within different SINR ranges q. 10 of the 100 SINR measurements, for instance, are between 20 dB and 25 dB (q=6), indicating low interference when compared to the SNR measurements of 25 dB. 10 other SINR measurements are between 0 dB and 5 dB (q=2), indicating high interference.

From this frequency distribution 60, the probability data generation circuit 24 may generate interference probability data 16 as an approximation of a probability density function 62. The probability density function 62 describes the probability that SINR at the mobile terminal 20 will fall within each of the SINR ranges q. That is, Prob(q). For example, based on observing 10 out of the 100 SINR measurements as falling within range q=6, the probability data generation circuit 24 approximates a probability density function 62 that indicates Prob(q=6)=0.1. In an analogous manner, the probability data generation circuit 24 approximates the probability density function 62 as indicating that Prob(q=1)=0.1, Prob (q=2)=0.1, Prob(q=3)=0.2, Prob(q=4)=0.3, Prob(q=5)=0.2, and Prob(q=7)=0.

The probability data generation circuit 24 may alternatively generate interference probability data 16 as an approximation of a cumulative distribution function 64. The cumulative distribution function 64 describes the probability that SINR at the mobile terminal 20 will fall within or above a certain SINR range q, Prob(SINR range≧q) (note that since the SINR ranges q are numbered in FIG. 2 as increasing with decreasing interference present at the mobile terminal 20, the cumulative distribution function 64 can also be understood as describing the probability that the interference at the mobile terminal 20 falls within or below a certain interference range). That is, based on observing 10 out of the 100 SINR measurements as falling within range q=6, and 0 measurements falling within range q=7, the probability data generation circuit 24 approximates a cumulative distribution function 64 that indicates Prob(q≧6)=0.1. In an analogous manner, the probability data generation circuit 24 approximates the cumulative distribution function 64 as indicating that Prob(q≧1)= 1.0, Prob(q≧2)=0.9, Prob(q≧3)=0.8, Prob(q≧4)=0.6, Prob (q≧5)=0.3, and Prob(q≧7)=0.

Based on the example interference probability data 16 shown in FIG. 2, the feedback information derivation circuit 25 derives channel quality feedback information 14 as shown in FIG. 3. In the example of FIG. 3, channel quality feedback information 14 comprises a recommended downlink transport format. The feedback information derivation circuit 25, therefore, derives channel quality feedback information 14 by selecting one of a plurality of downlink transport formats (TF 1, TF 2 . . . TF 7).

Each downlink transport format TF 1, TF 2 . . . TF 7 is associated with a different one of the SINR ranges q described by the interference probability data 16. Specifically, each downlink transport format TF 1, TF 2 . . . TF 7 can support a transmission 12 at a pre-determined performance metric if the SINR at the time of the transmission 12 falls within or above the SINR range q associated with that transport format.

In one embodiment, the feedback information derivation circuit 25 selects the recommended transport format by estimating, for each possible transport format TF 1, TF 2 . . . TF 7, the probability 66 that the mobile terminal 20 will successfully receive a transmission 12 if that transport format is recommended to the base station 30. The expected probability of successful reception 66 for each transport format TF 1, TF 2 . . . TF 7 is approximated as the probability that the interference at the mobile terminal 20 at the time of transmission 12 will be within or above the SINR range q associated with that transport format; that is, Prob(SINR range≧q), the very probability indicated by the cumulative distribution function 64 in FIG. 2. The derivation circuit 25 then selects the recommended transport format as the transport format having an expected probability of successful reception 66 closest to a pre-defined target probability. If the target probability is 0.8, for example, the derivation circuit 25 derives the channel quality feedback information 14 as a recommendation that the base station 30 use TF 3 for the transmission 12.

In another embodiment, the feedback information derivation circuit 25 derives channel quality feedback information 14 based on the probability of successfully receiving a pre-determined payload over a pre-determined number of transmissions 12. In the context of the above example, the derivation circuit 25 estimates this probability for different possible combinations of transport formats, where each transport format is used for a different one of the transmissions 12. The derivation circuit 25 then selects as channel quality feedback information 14 the combination of transport formats that has the greatest expected probability of successful reception.

FIG. 3 illustrates a simplified example of this embodiment, wherein the derivation circuit 25 derives channel quality feedback information 14 based on the probability 70 of successfully receiving a payload of twenty-four kilobytes (kb) over four independent transmissions 12 that each use the same transport format. In FIG. 3, each downlink transport format TF 1, TF2 . . . TF 7 supports transmission of a certain payload 68 in a given amount of time. For example, TF 2 supports a payload of six kb, TF 3 supports a payload of eight kb, TF 4 supports a payload of twelve kb, and TF 5 supports a payload of twenty-four kb (e.g., within 1 millisecond).

The derivation circuit 25 estimates, for each possible combination of transport formats, the probability 70 of successfully receiving the twenty-four kb payload over four independent transmissions 12; namely the probability of successfully receiving (1) each of four, six kb transmissions that use TF 2; (2) at least three of four, eight kb transmissions that use TF 3; (3) at least two of four, twelve kb transmissions that use TF 4; or (4) at least one of four, twenty-four kb transmissions that use TF 5. In one embodiment, the derivation circuit 25 estimates these probabilities 70 based on a binomial distribution:

$$\Pr(k, n, p) = \frac{n!}{k!(n-k)!} p^k (1-p)^{n-k} \qquad (1)$$

where Pr(k, n, p) represents the probability of successfully receiving exactly k out of n transmissions, each transmission having an individual probability p of successful reception. In this case, the derivation circuit 25 estimates the probability 70 of successfully receiving (1) exactly four, six kb transmissions using TF 2, each having an independent probability p of 0.9, as Pr(4,4,0.9)=0.6561; (2) at least three of four, eight kb transmissions using TF 3, each having an independent probability p of 0.8, as Pr(3,4,0.8)+Pr(4,4,0.8)=0.8192, (3) at least two of four, twelve kb transmissions using TF 4, each having an independent probability p of 0.6, as Pr(2,4,0.6)+Pr(3,4, 0.6)+Pr(4, 4,0.6)=0.8208; and (4) at least one of four, twenty-four kb transmissions using TF 5, each having an independent probability p of 0.3, as Pr(1,4,0.3)+Pr(2,4,0.3)+Pr(3,4,0.3)+ Pr(4,4,0.3)=0.7599. Because the greatest probability 70 of successful reception of a twenty-four kb load over four transmissions 12 occurs when those transmissions each use TF 4, the derivation circuit 25 selects that combination of transport formats as channel quality feedback information 14.

Of course, while the example in FIG. 3 only considered transmissions 12 that each use the same transport format, those skilled in the art will appreciate that the derivation of channel quality feedback information 14 may also consider transmissions 12 that use different transport formats. Moreover, those skilled in the art will appreciate that the derivation may further consider the added probability of successful reception provided by hybrid automatic repeat request (HARQ), or any other factor that affects the probability of successful reception of the payload over multiple transmissions 12.

Those skilled in the art will also appreciate that the above embodiments are not limited by the type of receiver 22 included in the mobile terminal 20. Indeed, the receiver 22 may be any type of receiver 22, including a receiver that attempts to cancel at least some of the interference at the mobile terminal 20. In one embodiment, for example, the interference measurement circuit 23 takes interference measurements at the output of a receiver capable of canceling interference. Accordingly, such capability is reflected in the interference measurements, in the interference probability data 16, and ultimately in the channel quality feedback information 14.

In other embodiments, the interference measurement circuit 23 takes interference measurements in such a manner that they do not reflect the interference-cancellation capabilities of the receiver 22 (e.g., at the input of the receiver 22). In this case, the probability data generation circuit 24 generates interference probability data 16 further based on one or more probability distributions of the extent to which interference at the mobile terminal improves over that measured by a mobile terminal without interference cancellation. FIG. 4 provides an example of this.

In FIG. 4, the probability data generation circuit 24 has generated a probability density function 72 describing the probability that SINR at the output of a receiver (RX1) without interference-cancellation capabilities will fall within each of the SINR ranges q, namely, Prob(q). Based on probability distributions 74-84 describing the probability that an interference canceling receiver 22 (RX2) will improve the SINR from that measured at the output of RX1, the probability data generation circuit 24 generates a probability density function 86 describing the probability that SINR at the output of RX2 will fall within a different SINR range p, namely Prob(p).

The probability distribution 74 indicates, for example, that there is a 0.2 probability that the SINR at the output of RX2 will fall within SINR range p=3, given that the SINR at the output of RX1 would have fallen within SINR range q=1. That is Prob(p=3|q=1)=0.2. Likewise, the probability distribution 76 indicates Prob(p=3|q=2)=0.5, and the probability distribution 78 indicates Prob(p=3|q=3)=0.3 (i.e., RX2 could not provide any improvement in the SINR range measured). Accordingly, the probability data generation circuit 24 computes the probability that the SINR at the output of RX2 will fall within SINR range p=3 as:

$$Prob(p=3) = Prob(p=3\mid q=1)*Prob(q=1) + \qquad (2)$$
$$Prob(p=3\mid q=2)*Prob(q=2) +$$
$$Prob(p=3\mid q=3)*Prob(q=3)$$
$$= 0.2*0.1 + 0.5*0.1 + 0.3*0.2$$
$$= 0.13$$

The probability data generation circuit 24 computes the remaining probabilities in a like manner, and may alternatively or additionally compute the cumulative distribution function 88 describing the probability that SINR at the output of RX2 will fall within or above a certain SINR range p.

Figure 5:
FIG. 5 is a table illustrating an example of various methods for controlling transmission to a mobile terminal based on interference probability data, which was generated based on a probability distribution of interference improvement.

With the interference probability data 16 generated as the probability density function 86 or the cumulative distribution function 88, the feedback information derivation circuit 25 derives channel quality feedback information 14 in the same manner as that described with respect to FIG. 3. FIG. 5 illustrates the same example, only with the expected probability 90 of successful reception corresponding to the cumulative distribution function 88, and the probability 92 of successful reception of a twenty-four kb payload over four transmissions 12 being derived accordingly.

While the above description and accompanying figures provided examples of specific types of interference probability data 16 (e.g., probability density function) and the statistical distribution of interference at the mobile terminal 20 (e.g., frequency distribution), those skilled in the art will appreciate that these examples are non-limiting. Indeed, in other embodiments, the statistical distribution of interference is determined based on comparing the variance of noise measurements to the variance of noise-plus-interference level measurements. Specifically, the noise measurement circuit 27 takes a plurality of noise measurements and the interference measurement circuit 23 takes a plurality of noise-plus-interference level measurements. The probability data generation circuit 24 then determines the statistical distribution of the interference by comparing the variance of the noise measurements to the variance of the noise-plus-interference level measurements.

Moreover, for ease of illustration, the above description has assumed that interference at the mobile terminal 20 is discontinuous only between different transmissions 12 in the time domain. Those skilled in the art will readily understand, however, that the present invention may be utilized even if interference at the mobile terminal 20 is also discontinuous across the bandwidth of a single transmission 12 in the frequency domain (e.g., as is the case where the wireless communication system 10 utilizes Orthogonal Frequency-Division Multiplexing, OFDM). In one embodiment, for example, the interference measurement circuit 23 measures interference at the mobile terminal 20 both over the measurement periods and in each one of a plurality of frequency ranges. In this case, the mobile terminal 20 operates in a manner similar to that described above, with the interference probability data 16 and channel quality feedback information 14 being derived for certain ones of the frequency ranges.

Accordingly, those skilled in the art will appreciate that the wireless communication system 10 may comprise a Wideband CDMA (WCDMA)-based system, a CDMA2000-based system, or the like. As such, the mobile terminal 20 may comprise a cellular telephone, a Portable Digital Assistant, a laptop compute, etc.

With the above points of variation and implementation of the mobile terminal 20 in mind, those skilled in the art will appreciate that the mobile terminal 20 of the present invention generally performs the method illustrated in FIG. 6. According to FIG. 6, the interference measurement circuit 23 measures interference at the mobile terminal 20 over each one of a plurality of measurement periods (Block 100), and the probability data generation circuit 24 generates interference probability data 16 based on the statistical distribution of this interference (Block 110). The feedback information derivation circuit 25 derives channel quality feedback information 14 from the interference probability data 16 (Block 120), whereupon that information 14 is transmitted to the base station 30 by the transmitter 26 (Block 130).

In some embodiments, the transmitter 26 also transmits the interference probability data 16 to the base station 30, e.g., as part of the same transmission that reports the channel quality feedback information 14 to the base station 30, or as a separate transmission. In this case, the base station 30 generally performs the method illustrated in FIG. 7 (see also FIG. 1). In FIG. 7, the receiver 34 of the base station 30 receives the interference probability data 16 from the mobile terminal 20 (Block 200), and the transmission control circuit 36 controls transmissions 12 based on that data 16 (Block 210). Such control may entail, for example, scheduling the transmission 12, selecting transmission rank, selecting between open-loop or closed-loop MIMO modes, selecting a downlink transport format, or otherwise selecting a transmission parameter for the transmissions 12.

Indeed, the transmission control circuit 36 in one embodiment selects a transmission parameter for the transmissions 12 in the same way that the feedback information circuit 25 derives the channel quality feedback information 14 (which, as described above, may actually be a recommended transmission parameter). Thus, the above description and examples in FIGS. 3-5 apply equally to the base station 30. That is, the receiver 34 may receive the cumulative distribution function 64 in FIG. 2 as the interference probability data 16, and the transmission control circuit 36 may select a transport format as the transmission parameter in the same way as that above described with respect to FIG. 3.

Of course, it should be understood that the foregoing description and the accompanying drawings represent non-limiting examples of the methods and individual apparatuses taught herein. As such, the present invention is not limited by the foregoing description and accompanying drawings. Instead, the present invention is limited only by the following claims and their legal equivalents.

What is claimed is:

1. A method implemented by a mobile terminal for providing channel quality feedback to a base station, comprising:
    measuring interference at the mobile terminal over each one of a plurality of measurement periods;
    generating interference probability data based on the statistical distribution of the interference;
    selectively deriving channel quality feedback information from said interference probability data; and
    transmitting said channel quality feedback information to the base station.

2. The method of claim 1, further comprising measuring noise at the mobile terminal over each one of the plurality of measurement periods, and wherein selectively deriving the channel quality feedback information from said interference probability data comprises:
    deriving the channel quality feedback information from the interference probability data if the level of noise falls below a pre-defined noise threshold; and
    if the level of noise rises above the pre-defined noise threshold, deriving the channel quality feedback information based on a mapping of an instantaneous or time-averaged channel quality measurement to a plurality of channel quality feedback information values.

3. The method of claim 1, wherein measuring interference at the mobile terminal comprises measuring a noise-plus-interference level at the mobile terminal over each one of the plurality of measurement periods, and wherein the method further comprises measuring noise at the mobile terminal over each of the plurality of measurement periods, and determining the statistical distribution of the interference by comparing the variance of the noise measurements to the variance of the noise-plus-interference level measurements.

4. The method of claim 1, wherein generating interference probability data comprises generating a probability distribution indicating expected interference at the mobile terminal.

5. The method of claim 1, further comprising transmitting said interference probability data to the base station in addition to said channel quality feedback information.

6. The method of claim 1, wherein selectively deriving channel quality feedback information comprises selecting one of a plurality of downlink transport formats based on said interference probability data, and wherein transmitting said channel quality feedback information to the base station comprises transmitting the selected downlink transport format to the base station.

7. The method of claim 1, wherein selectively deriving channel quality feedback information based on said interference probability data comprises:
    estimating, for each possible value of the channel quality feedback information, an expected probability of successful reception, based on the interference probability data; and
    selecting as the channel quality feedback information the value having an expected probability of successful reception closest to a pre-defined target probability.

8. The method of claim 1, wherein selectively deriving channel quality feedback information based on said interference probability data comprises:
    estimating, for each possible combination of values of the channel quality feedback information over a pre-determined number of transmissions, an expected probability of successfully receiving a pre-determined payload over the pre-determined number of transmissions, based on the interference probability data; and
    selecting as the channel quality feedback information the combination of values having the greatest expected probability of successful reception.

9. The method of claim 1, wherein measuring interference at the mobile terminal over each of a plurality of measurement periods comprises measuring interference at the mobile terminal in each one of a plurality of frequency ranges.

10. The method of claim 1, further comprising attempting to cancel at least some interference at the mobile terminal, and generating said interference probability data further based on one or more probability distributions of the extent to which interference at the mobile terminal improves over that measured by a mobile terminal without interference cancellation.

11. A mobile terminal configured to provide channel quality feedback to a base station, comprising:
    an interference measurement circuit configured to measure interference at the mobile terminal over each of a plurality of measurement periods;
    a probability data generation circuit configured to generate interference probability data based on the statistical distribution of the interference;
    a feedback information derivation circuit configured to selectively derive channel quality feedback information from said interference probability data; and
    a transmitter configured to transmit said channel quality feedback information to the base station.

12. The mobile terminal of claim 11, further comprising a noise measurement circuit configured to measure noise at the mobile terminal over each of the plurality of measurement periods, and wherein the feedback information derivation circuit is configured to:
    derive the channel quality feedback information from the interference probability data if the level of noise falls below a pre-defined noise threshold; and
    if the level of noise rises above the pre-defined noise threshold, derive the channel quality feedback information based on a mapping of an instantaneous or time-averaged channel quality measurement to a plurality of channel quality feedback information values.

13. The mobile terminal of claim 11, further comprising a noise measurement circuit configured to measure noise at the mobile terminal over each of the plurality of measurement periods, wherein the interference measurement circuit is configured to measure interference at the mobile terminal by measuring a noise-plus-interference level at the mobile terminal over each of the plurality of measurement periods, and wherein the probability data generation circuit is further configured to determine the statistical distribution of the interference by comparing the variance of the noise measurements to the variance of the noise-plus-interference level measurements.

14. The mobile terminal of claim 11, wherein the probability data generation circuit is configured to generate interference probability data as a probability distribution indicating expected interference at the mobile terminal.

15. The mobile terminal of claim 11, wherein the transmitter is further configured to transmit said interference probability data to the base station in addition to said channel quality feedback information.

16. The mobile terminal of claim 11, wherein the feedback information derivation circuit is configured to selectively derive channel quality feedback information by selecting one of a plurality of downlink transport formats based on said interference probability data, and wherein the transmitter is configured to transmit said channel quality feedback information to the base station by transmitting the selected downlink transport format to the base station.

17. The mobile terminal claim 11, wherein the feedback information derivation circuit is configured to selectively derive channel quality feedback information based on said interference probability data by:
   estimating, for each possible value of the channel quality feedback information, an expected probability of successful reception, based on the interference probability data; and
   selecting as the channel quality feedback information the value having an expected probability of successful reception closest to a pre-defined target probability.

18. The mobile terminal of claim 11, wherein the feedback information derivation circuit is configured to selectively derive channel quality feedback information based on said interference probability data by:
   estimating, for each possible combination of values of the channel quality feedback information over a pre-determined number of transmissions, an expected probability of successfully receiving a pre-determined payload over the pre-determined number of transmissions, based on the interference probability data; and
   selecting as the channel quality feedback information the combination of values having the greatest expected probability of successful reception.

19. The mobile terminal of claim 11, wherein the interference measurement circuit is configured to measure interference at the mobile terminal over each of a plurality of measurement periods by measuring interference at the mobile terminal in each one of a plurality of frequency ranges.

20. The mobile terminal of claim 11, further comprising a receiver configured to attempt to cancel at least some interference at the mobile terminal, and wherein the probability data generation circuit is configured to generate said interference probability data further based on one or more probability distributions of the extent to which interference at the mobile terminal improves over that measured by a mobile terminal without interference cancellation.

21. A method implemented by a base station for controlling transmission to a mobile terminal, comprising:
   receiving from the mobile terminal interference probability data generated based on the statistical distribution of interference measured at the mobile terminal over each one of a plurality of measurement periods; and
   controlling transmission to the mobile terminal based on said interference probability data.

22. The method of claim 21, further comprising receiving channel quality feedback information from the mobile terminal, and wherein controlling transmission to the mobile terminal is further based on said channel quality feedback information.

23. The method of claim 21, wherein controlling transmission to the mobile terminal based on said interference probability data comprises at least one of:
   selecting one of a plurality of downlink transport formats;
   selecting transmission rank;
   selecting between open-loop or closed-loop multiple-input-multiple-output transmission modes; and
   scheduling the transmission.

24. The method of claim 21, wherein controlling transmission to the mobile terminal based on said interference probability data comprises:
   estimating, for each possible value of a transmission parameter, an expected probability of successful reception by the mobile terminal, based on the interference probability data; and
   selecting as the transmission parameter the value having an expected probability of successful transmission closest to a pre-defined target probability.

25. The method of claim 21, controlling transmission to the mobile terminal based on said interference probability data comprises:
   estimating, for each possible combination of values of a transmission parameter over a pre-determined number of transmissions, an expected probability of the mobile terminal successfully receiving a pre-determined payload over the pre-determined number of transmissions, based on the interference probability data; and
   selecting as the transmission parameter over a pre-determined number of transmissions the combination of values having the greatest expected probability of successful reception.

26. A base station configured to control transmission to a mobile terminal, comprising:
   a receiver configured to receive from the mobile terminal interference probability data generated based on the statistical distribution of interference measured at the mobile terminal over each one of a plurality of measurement periods; and
   a transmission control circuit configured to control transmission to the mobile terminal based on said interference probability data.

27. The base station of claim 26, wherein the receiver is further configured to receive channel quality feedback information from the mobile terminal, and wherein the transmission control circuit is further configured to control transmission to the mobile terminal based on said channel quality feedback information.

28. The method of claim 26, wherein the transmission control circuit is configured to control transmission to the mobile terminal by at least one of selecting one of a plurality of downlink transport formats, selecting transmission rank, selecting between open-loop or closed-loop multiple-input-multiple-output transmission modes, and scheduling the transmission.

29. The method of claim 26, wherein the transmission control circuit is configured to control transmission to the mobile terminal based on said interference probability data by:
   estimating, for each possible value of a transmission parameter, an expected probability of successful reception by the mobile terminal, based on the interference probability data; and selecting as the transmission parameter the value having an expected probability of successful transmission closest to a pre-defined target probability.

30. The method of claim 26, wherein the transmission control circuit is configured to control transmission to the mobile terminal based on said interference probability data by:

estimating, for each possible combination of values of a transmission parameter over a pre-determined number of transmissions, an expected probability of the mobile terminal successfully receiving a pre-determined payload over the pre-determined number of transmissions, based on the interference probability data; and selecting as the transmission parameter over a pre-determined number of transmissions the combination of values having the greatest expected probability of successful reception.

* * * * *

UNITED STATES PATENT AND TRADEMARK OFFICE
CERTIFICATE OF CORRECTION

PATENT NO. : 8,369,793 B2
APPLICATION NO. : 12/572415
DATED : February 5, 2013
INVENTOR(S) : Molnar It is certified that error appears in the above-identified patent and that said Letters Patent is hereby corrected as shown below:

In the Specification:

In Column 7, Line 23, delete "Prob(q=≥1)=" and insert -- Prob(q≥1)= --, therefor.

Signed and Sealed this
Fourteenth Day of May, 2013

Teresa Stanek Rea
*Acting Director of the United States Patent and Trademark Office*